United States Patent
Stokes et al.

[11] Patent Number: 6,049,648
[45] Date of Patent: Apr. 11, 2000

[54] S-Z STRANDED OPTICAL CABLE WITH OPTIMIZED SHORT ROL PITCH

[75] Inventors: Stephen R. Stokes; Natalie Roskam, both of Raleigh, N.C.; Takashi Tanaka, Kamakura, Japan; William E. Beasley, Jr., Durham, N.C.

[73] Assignee: Sumitomo Electric Lightwave Corp., Research Triangle Park, N.C.

[21] Appl. No.: 09/140,386

[22] Filed: Aug. 26, 1998

[51] Int. Cl.⁷ .................................................. G02B 6/44
[52] U.S. Cl. .............................................. 385/111; 385/112
[58] Field of Search .................................. 385/100–114

[56] References Cited

U.S. PATENT DOCUMENTS

| | | | |
|---|---|---|---|
| 4,408,443 | 10/1983 | Brown et al. | 57/204 |
| 4,828,352 | 5/1989 | Kraft | 350/96.23 |
| 5,703,983 | 12/1997 | Beasley, Jr. | 385/104 |
| 5,905,834 | 5/1999 | Anderson et al. | 385/111 |

OTHER PUBLICATIONS

Raychem, "AIR FOSC™ Aerial Fiber Optic Cable Closure System" (Sep., 1994).
Siecor, "If You're not Using ALTOS™ Cable You're Shooting Blanks" (Sep. 9–12, 1996).

*Primary Examiner*—Hung N. Ngo
*Attorney, Agent, or Firm*—Jenkins & Wilson, P.A.

[57] ABSTRACT

Loose tube fiber optic cable containing a core of S-Z stranded strands comprising optical fibers having first and second alternatively repeating first and second sections, and a sheath circumscribing the core. The ROL transition points defined by the junctures of first and second strand sections along the length of the cable have been provided at an optimized reduced distance therebetween that is approximately ½ of the longitudinal length of the sheath entry window created during mid-span entry of the loose tube fiber optic cable. Thus, at least one (1) ROL transition point will be located within the sheath entry window during mid-span entry access to the cable, and most suitably either two (2) or three (3) ROL transition points will be located.

12 Claims, 3 Drawing Sheets

S-Z STRANDED OPTICAL CABLE WITH OPTIMIZED SHORT ROL PITCH

TECHNICAL FIELD

The present invention relates to an S-Z stranded optical cable of the type utilizing reverse oscillating lay (ROL), and more particularly, to an improved S-Z stranded loose tube fiber optic cable wherein the junctures between the S and Z strands define an optimal short pitch of about ½ of the longitudinal length of the sheath entry window.

RELATED ART

As is well known, loose tube optical cables are comprised of multiple buffer tubes stranded around a central strength member (CSM). The tubes are either filled with multiple optical fibers or are dummy tubes used to maintain optical cable construction geometry. The cable sheath can comprise a combination of plastic and metallic layers depending on the intended application of use of the fiber optic cable.

As is also well known to those skilled in the art, a technology referred to as reverse oscillating lay (ROL) or S-Z stranding was introduced in the last decade. S-Z stranding winds the buffer tubes around the central strength member (CSM) of a cable in a clockwise direction for a predetermined number of winds and then changes direction and winds the tubes in a counter-clockwise direction for a predetermined number of winds, and then changes back to the clockwise direction for a predetermined number of winds and so forth. This stranding technology aids in a cable entry technique well known now as the mid-span entry technique wherein, as opposed to a cable end entry, mid-span entry entails opening a cable sheath at a location along its mid-span and accessing selected optical fibers for breakout and connection. The objective is that only the optical fibers that are desired to be broken out are cut and the remaining optical fibers are untouched in the fiber optic cable. In order to perform a mid-span access of a S-Z stranded loose tube cable, a technician must first locate a ROL transition point and then unwrap the required buffer tube or tubes at that location.

By way of still further explanation and example of the prior art, fiber optic cable to which telephone subscribers are connected or spliced is generally called a distribution cable. Often it is necessary to make a connection adjacent to a subscriber's premise to a fiber in the distribution cable at a place other than at the cable ends. With conventional loose tube fiber optic cable constructions, it is often difficult to splice into an optical fiber in a fiber optic cable other than at the cable ends since, when the cable core is exposed by removal of the cable jacket or sheath, the fibers are usually found to be tightly held in place due to the previously described helical construction of the cable core. Thus, there is little or no excess fiber length that a technician can utilize or pull away from the core to facilitate easy handling without a likelihood of damage to other fibers in the core. Thus, the development of S-Z stranding or "reverse oscillating lay" (ROL) was a significant advancement in the art since it tended to provide a solution to this well-known problem of lack of excess fiber length at a mid-span entry location in a fiber optic cable.

To facilitate the mid-span entry of S-Z stranded fiber optic cable as described above, it became known to use a mark or marking on the outermost surface of the fiber optic cable that is transversely coextensive with the joint of the first and second sections of the S-Z stranded optical cable since the buffer tube length or tightly buffered fiber length provides slack in the optical fibers at the ROL reversal points of the S-Z stranding. Therefore, by using a mark or marks at the reversal point of the S-Z stranding of a fiber optic cable, a technician is able to know where in the cable excess fiber is available for ease in making connections other than at the cable ends. See, for example, U.S. Pat. No. 4,828,35 issued May 9, 1989 to Kraft, and the disclosure of which is incorporated herein by reference.

Even more recently, deployment of fiber optic cable into a local loop has brought about a need for a special type of mid-span entry access known to those skilled in the art as "taut sheath" entry. In this circumstance, the fiber optic cable is straight and without slack when installed. Special splice closures have been developed which have an increased length in order to assist in achieving as much optical fiber slack as possible for splicing. This type of splice closure (or enclosure) has a length that is relatively short compared to the distance between the ROL transition points of the fiber optic cable, and this poses a problem for a technician when attempting to determine where to open a fiber optic cable sheath in order to place one of the splice closure devices.

Sheath marking location accuracy is another disadvantage to relying on sheath marks to locate the ROL transition points. The industry accepted tolerance for sheath marking error is ±6 inches; in other words, the sheath mark must be within ±6 inches of the actual ROL transition location. If the sheath mark error is a full six inches, the error reduces the amount of buffer tube slack that can be unwound to 50% of the sheath opening window assuming the sheath opening is 24 inches long. The advantage of applicants' invention is that it does not matter where the sheath is entered, the craftsperson will have access to the fully 24 inches of tube slack.

For all of the reasons noted hereinbefore, it is desirable for a technician to be able to open a "window" in a fiber optic cable sheath which will center around one of the ROL transition points to facilitate making a splice and/or placement of a splice closure (or enclosure). The ROL transition point must be centered in the opening in order to gain full slack (full access) to buffer tubes within the cable. Unfortunately, current methods of marking the outer sheath at the ROL transition points suffer shortcomings since it can become difficult to locate the markings due to long-term exposure to weather elements and/or installation procedures that tend to degradate the marks on the outer surface of the fiber optic cable sheath.

Thus, there is a long-felt need for a better technique for marking the ROL transition points of a fiber optic cable than those techniques presently known to those skilled in the fiber optic cable art. One such improved technique is disclosed in U.S. Pat. No. 5,703,983 to Beasley, Jr (assigned to Sumitomo Electric Lightwave Corp., the assignee of the present invention) which discloses providing an indicator beneath the cable sheath and in a medial position between corresponding pairs of junctures of S and Z stranded strands of a fiber optic cable. However, although more advantageous than some other techniques known for marking the ROL transition points of a fiber optic cable, this technique also is not entirely advantageous in locating the transition in the center of window. The primary advantage of the core indicator is that it prevents the indicator marking from being lost due to environmental degradation and abrasion. The major disadvantage is that the cable must be entered on a limited basis with a small window to locate either an ROL transition or an indicator. If an indicator is found on limited entry, then the sheath must be selectively removed in the correct direction to access the closest ROL transition point.

This technique does not guarantee that the craftsperson will end up with the ROL transition point centered within the window opening. Whether or not the ROL transition point can be located so as to center it within the window opening depends solely on luck and the distance between ROL transition points which varies from cable size to size and manufacturer to manufacturer. The luck component comes into play with the initial limited sheath opening window and how fortunate the individual is at getting close to an ROL transition point versus the distance between transition points. If the initial opening is mid-way between transition points and the distance between transition points is relatively long, the resulting error in centering the transition point within the final window opening will be relatively large.

Thus, there remains a long-felt need for S-Z stranded optical cable wherein the ROL transition points in the fiber optic cable can be easily located during access by a sheath entry window in a loose tube fiber optic cable. Applicants' novel loose tube fiber optic cable will be described in more detail below so as to be fully understood and appreciated by one skilled in the art.

DISCLOSURE OF THE INVENTION

In accordance with the present invention, applicants provide a loose tube fiber optic cable designed specifically to facilitate mid-span entry of the fiber optic cable at a selected location along its length where a technician will be assured to locate at least one (and probably two or three) ROL transition points. The loose tube fiber optic cable comprises a core having a sheath entry window formed thereto. The cable contains S-Z stranded strands comprising optical fibers and has alternatively repeating first and second sections. The first and second sections define junctures therebetween wherein the longitudinal distance between the junctures is about ½ of the longitudinal length of the sheath entry window, and a sheath circumscribes the core and is positioned between the splice enclosure and the core. In this manner, mid-span entry of the fiber optic cable at a selected location along its length and at a juncture of a first and second strand section is facilitated since a technician opening the loose tube fiber optic cable with the sheath entry window will be assured of locating at least one complete juncture of the first and second sections.

It is therefore an object of the present invention to provide an improved loose tube fiber optic cable construction wherein a technician effecting mid-span access of the fiber optic cable will locate at least one reversal point of the optical fiber strands.

It is another object of the present invention to provide an improved loose tube fiber optic cable construction to provide an optimized distance between ROL transition points to assure sheath entry window access of two or more ROL transition points by a technician.

Some of the objects of the invention having been stated, other objects will become evident as the description proceeds, when taken in connection with the drawings described below.

BEST MODE FOR CARRYING OUT THE INVENTION

Figure 1:
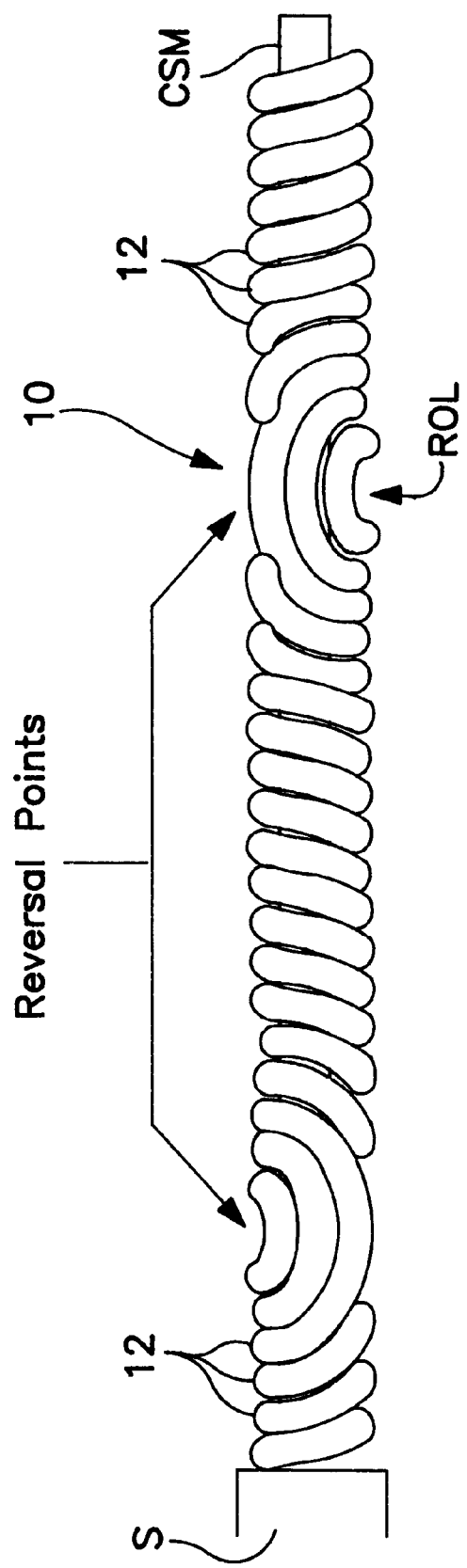
FIG. 1 is a side elevation of a conventional loose tube fiber optic cable with the sheath circumscribing the core removed for clarity and depicting the ROL transition points of the buffer tube.

By way of further description, fiber optic cable is used in the telecommunications industry to transmit signals for both voice and data communication. In telecommunications, fiber optic cable is a distribution cable which carries the signal from a central office throughout cities, countries, and even across oceans. Often after installation of a fiber optic cable, the specific fibers in the cable must be accessed in the mid-span of the cable in order to add additional subscribers in a process known to those skilled in the cable art as "mid-span access". In order to allow sufficient slack optical fiber for a technician to effect access, many fiber optic cable manufacturer, presently use reverse oscillating lay (ROL) or S-Z stranding of buffer tubes in a loose tube fiber optic cable construction. In this fashion, when a technician identifies an ROL transition point, he can easily remove one or more selected buffer tubes by unwinding the buffer tube or tubes from the ROL transition point.

The "taut sheath" mid-span entry technique is used with fiber optic cable when a technician needs to access loose tubes in a substantially straight fiber optic cable in order to add the aforementioned additional subscribers. Since fiber optic cable is installed without any significant slack along the length thereof, entry must be affected over only the length of the splice enclosure (not shown). A technician with this technique typically enters a fiber optic cable in a relatively "short" distance known as the "sheath entry window" ("short" as compared to the conventional distance between ROL transition points). As is well known to those skilled in the cable art, it is difficult for a technician to remove the outer sheath of the fiber optic cable and search for a core ROL transition point in an effort to acquire enough slack to create the desired connection for additional subscribers. The applicants have overcome the well-known problems associated with marking of fiber optic cable sheath or the cable core carried thereby with a new loose tube fiber optic cable construction that reduces the conventional distance between ROL reversal points to about ½ of the length of a conventional sheath entry window to the core to assure that at least one ROL transition point is located within the length of cable sheath removed during a random mid-span access procedure.

The surprising result of applicants' novel loose tube fiber optic cable construction is that a technician is not required to be concerned about the marked location of ROL transition points since he can now enter the loose tube fiber optic cable at random and still find at least one ROL transition point within the sheath entry window created by the mid-span access technique. Preferably, applicants' loose tube fiber optic cable is constructed so that a technician will locate either two (2) full ROL transition points or one (1) full transition point and two (2) partial ROL transition points within the sheath entry window when the mid-span entry procedure is effected upon applicants' fiber optic cable.

In addition to well-known fiber optic cable industry utilization of markings on the outermost sheath of the fiber optic cable to indicate the location of ROL transition points as well as marks inside of the optical fiber cable sheath and typically on the fiber optic cable core, in the past one attempted solution to the problem of locating ROL transition points of a fiber optic cable was to manufacture fiber optic cable with distances between ROL transition points being less than the desired sheath opening distance. This approach was intended to assure that at least one ROL transition point would be found when the cable sheath is randomly accessed. This approach, however, was unsatisfactory in many circumstances of cable manufacture and use. Simply making the ROL transition distance less than the sheath opening distance guarantees the user of obtaining one transition within the opening window; however, in order to allow full slack of buffer tubes over the entire window length, the transition must be centered within the window opening. If the transition is not centered within the window opening, the amount of buffer tube slack will be limited to the distance from the transition point to the closest sheath edge. In order to gain buffer tube slack over the entire window length with randomly placed ROL transition points, the distance between ROL transition points must be approximately one half the window opening width or less.

In addition, manufacturing a fiber optic cable core with short ROL transition points at a given rate of stranding requires the buffer tube stranding line to run at higher rotational speeds. The higher rotational speeds impart greater stress to the buffer tubes causing increased optical transmission losses. These equipment limitations have precluded applicants' ability to manufacture a product with significantly shortened ROL transition points until recently with the introduction of relatively new manufacturing technologies.

Figure 2A:
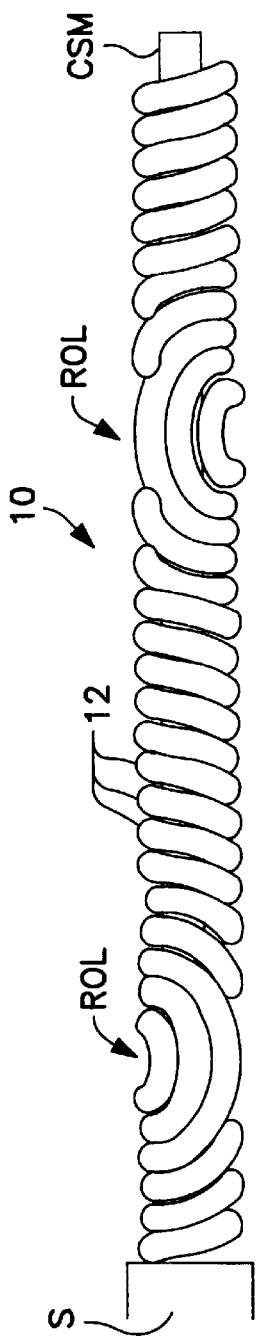
FIGS. 2A–2C are side elevation views similar to FIG. 1 showing mid-span access of one buffer tube of the conventional fiber optic cable at an ROL transition point.
Figure 2B:
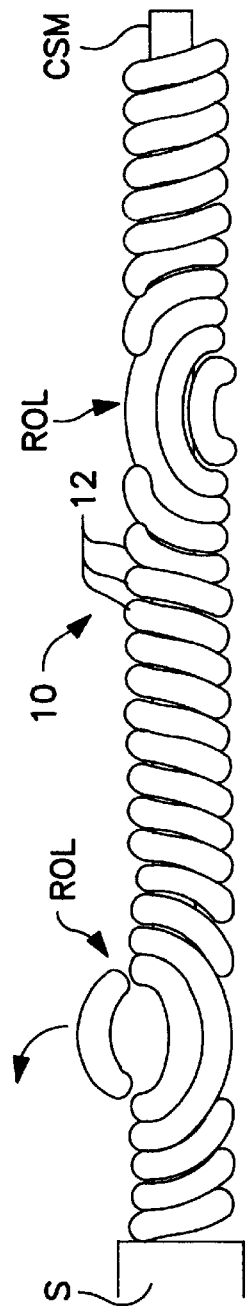
Figure 2C:
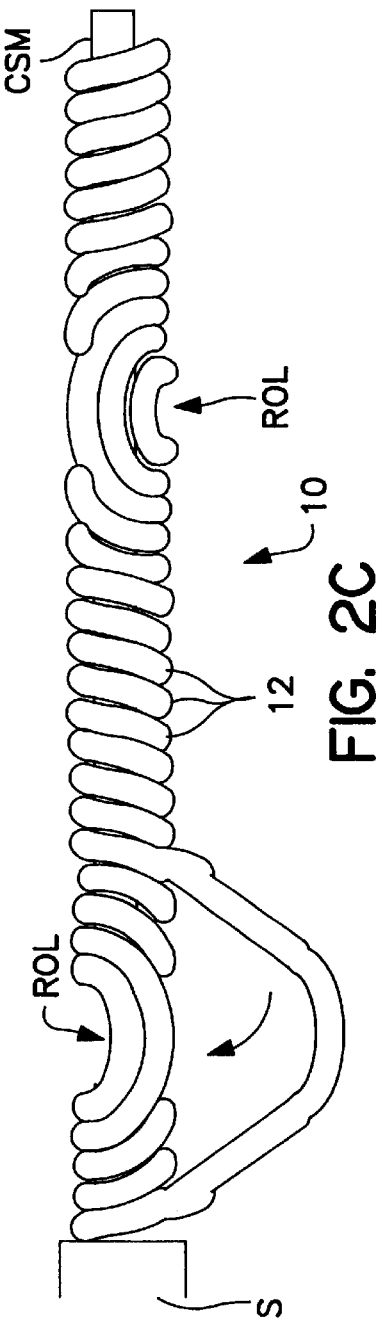
Figure 3:
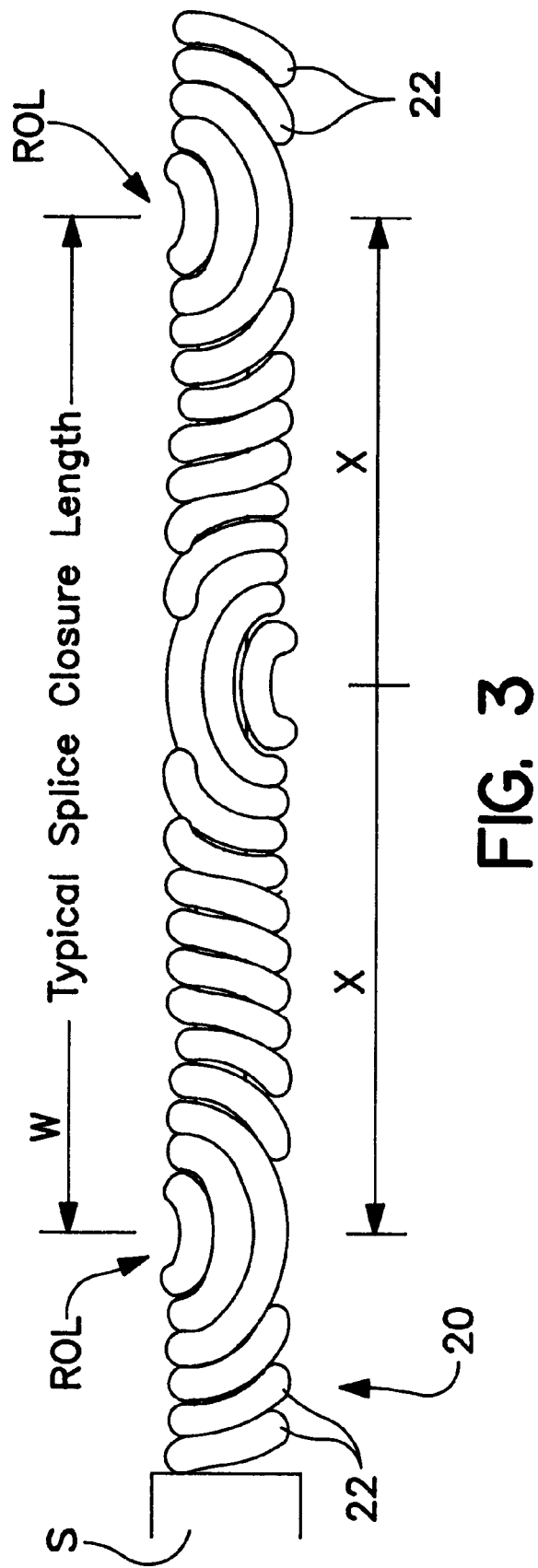
FIG. 3 is a side elevation view similar to FIG. 1 illustrating a loose tube fiber optic cable of the present invention wherein the distance between ROL transition points has been reduced to about ½ of the longitudinal length of the sheath entry window W.

Referring now to FIGS. 1–3, a conventional loose tube or stranded buffer tube fiber optic cable generally designated 10 is shown in FIGS. 1 and 2. The outermost cable sheaths have been removed in the drawings for clarity of understanding. Loose tube fiber optic cable 10 comprises S-Z stranded buffer tubes 12 that are stranded around a conventional central strength member (CSM) in a manner so as to create reverse oscillating lay (ROL) points periodically along the length of cable 10. Sheath S, preferably formed of plastic or of layers of strength elements such as metallic armor and plastic, surrounds the core of fiber optic cable 10 formed by the stranded buffer tubes 12. The ROL transition points facilitate partial unwinding of one or more selected buffer tubes 12 and access or entry to a selected one or more of the optical fibers (not shown) therein for splicing or the like.

Applicants' novel loose tube fiber optic cable is shown in FIG. 3 and generally designated 20. Loose tube fiber optic cable 20 comprises S-Z stranded buffer tubes 22 that are stranded around conventional central strength member (CSM) similarly to conventional fiber optic cable 10 shown in FIGS. 1 and 2. However, applicants' novel loose tube fiber optic cable 20 differs from the construction of conventional fiber optic cable 10 shown in FIGS. 1 and 2 in that the distance X between the ROL points has been substantially reduced to assure that at least one (1) ROL point is located within the sheath entry window W formed during the mid-span entry procedure. Most preferably, the longitudinal distance X between ROL points is between about 10 to 18 inches and the sheath entry window W has a longitudinal length of about 22 to 26 inches. Most preferably, the longitudinal distance X between ROL points is about 12 inches and the sheath entry window W is about 24 inches in length. In this fashion, a technician can enter loose tube fiber optic cable 20 randomly and find one (1) or more ROL points within sheath entry window W.

Summarily, by constructing fiber optic cable 20 wherein the distance between ROL points has been shortened to about ½ of that of the required sheath entry window W for mid-span access, a technician will be assured of locating one (1) or more ROL points within the length of window W into the cable sheath during conventional random mid-span access of the cable. Most suitably, novel cable 20 is constructed such that either two (2) complete ROL points or one (1) complete point and two (2) partial ROL points will be located during random mid-span access along the length of cable 20 by a technician. As is well known to those skilled in the art, the mid-span entry access can be effected either prior to or subsequent to positioning of a conventional splice enclosure over sheath entry window W of cable 20.

Finally, applicants wish to note that the loose tube fiber optic cable 20 of the invention as shown in FIG. 3 of the drawings provides certain access to at least one (1) and usually either two (2) or three (3) ROL points without relying on conventional markings on the outer sheath S of fiber optic cable 20. By obviating the reliance on cable markings to locate ROL points, the condition and accuracy of cable markings as well as the necessity for cable re-marking is also substantially a moot issue. Finally, the applicants note that loose tube fiber optic cable 20 may have various cable wrapping or sheath configurations (not shown) as required or requested by customers and still allow for successful random mid-span access as described hereinbefore.

It will be understood that various details of the invention may be changed without departing from the scope of the invention. Furthermore, the foregoing description is for the purpose of illustration only, and not for the purpose of limitation—the invention being defined by the claims.

What is claimed is:

1. A loose tube fiber optic cable comprising:

(a) a core having a sheath entry window formed thereto and containing S-Z stranded strands containing optical fibers and having first and second alternatively repeating first and second sections, said first and second sections defining junctures therebetween wherein the longitudinal distance between said junctures is about ½ of the longitudinal length of said sheath entry window; and (b) a sheath circumscribing the core;

whereby mid-span entry of the fiber optic cable at a selected location along its length and at a juncture of a first and a second strand section is facilitated since a technician opening said fiber optic cable with said sheath entry window will locate one or more junctures of said first and second sections.

2. The fiber optic cable of claim 1, wherein said strands each comprise a plurality of optical fibers loosely circumscribed by a tube.

3. The fiber optic cable of claim 2, wherein said plurality of strands comprise a plurality of buffer tubes.

4. The fiber optic cable of claim 3, wherein said plurality of buffer tubes are stranded around a central strength member.

5. The fiber optic cable of claim 1, wherein said sheath entry window has a length of about 22 to 26 inches.

6. The fiber optic cable of claim 5, wherein the longitudinal distance between said junctures of said first and second sections is between about 10 to 18 inches.

7. The fiber optic cable of claim 1, wherein each mid-span entry through a corresponding sheath entry window will locate two or more junctures of said first and second sections.

8. A loose tube fiber optic communications cable comprising:

(a) a core having a sheath entry window formed thereto and containing S-Z stranded strands and having first and second alternatively repeating first and second sections, said first and second sections defining junctures therebetween wherein the longitudinal distance between said junctures is about 10–18 inches; and (b) a sheath circumscribing the core;

whereby mid-span entry of the cable at a selected location along its length and at a juncture of a first and a second strand section is facilitated since a technician opening said cable with a sheath entry window substantially equal to the length of a splice enclosure to be positioned over said cable will locate two or more junctures of said first and second sections.

9. The fiber optic cable of claim 8, wherein said strands each comprise a plurality of optical fibers loosely circumscribed by a tube.

10. The fiber optic cable of claim 9, wherein said plurality of strands comprise a plurality of buffer tubes.

11. The fiber optic cable of claim 10, wherein said plurality of buffer tubes are stranded around a central strength member.

12. The fiber optic cable of claim 8, wherein said sheath entry window has a length between about 22 to 26 inches.

* * * * *